United States Patent
Ritter et al.

(10) Patent No.: US 7,478,069 B1
(45) Date of Patent: Jan. 13, 2009

(54) METHOD, COMMUNICATIONS SYSTEM AND RECEIVER DEVICE FOR THE BILLING OF ACCESS-CONTROLLED PROGRAMMES AND/OR DATA FROM BROADCAST TRANSMITTERS

(75) Inventors: Rudolf Ritter, Zollikofen (CH); Claude Trinchan, Givisiez (CH)

(73) Assignee: Kudelski S.A., Cheseaux-Sur Lausanne (CH)

( * ) Notice: Subject to any disclaimer, the term of this patent is extended or adjusted under 35 U.S.C. 154(b) by 734 days.

(21) Appl. No.: 10/221,138

(22) PCT Filed: Aug. 15, 2000

(86) PCT No.: PCT/CH00/00435

§ 371 (c)(1),
(2), (4) Date: Sep. 10, 2002

(87) PCT Pub. No.: WO01/67762

PCT Pub. Date: Sep. 13, 2001

(51) Int. Cl.
*G06F 17/60* (2006.01)

(52) U.S. Cl. .............................. 705/52; 705/50; 705/34

(58) Field of Classification Search ................ 705/51, 705/50, 52, 34; 380/1, 228; 370/313
See application file for complete search history.

(56) References Cited

U.S. PATENT DOCUMENTS

| | | | |
|---|---|---|---|
| 4,710,955 A | 12/1987 | Kauffman | |
| 5,619,247 A | 4/1997 | Russo | |
| 5,914,941 A * | 6/1999 | Janky | 370/313 |
| 6,016,348 A * | 1/2000 | Blatter et al. | 380/228 |
| 6,430,290 B1 * | 8/2002 | Van Willigen et al. | 380/1 |
| 6,993,137 B2 * | 1/2006 | Fransdonk | 705/51 |
| 2004/0019539 A1 * | 1/2004 | Raman et al. | 705/29 |
| 2006/0204006 A1 * | 9/2006 | Scheidt et al. | 380/44 |

FOREIGN PATENT DOCUMENTS

| | | |
|---|---|---|
| DE | 198 46 452 A | 12/1999 |
| EP | 0 128 555 A | 12/1984 |
| EP | 0 314 203 A | 5/1989 |
| EP | 0 789 337 A | 8/1997 |
| JP | 2002056426 A * | 2/2002 |
| WO | WO 91 18467 A | 11/1991 |

OTHER PUBLICATIONS

Patent Abstract of Japan, vol. 010, No. 289, Oct. 2, 1986.

* cited by examiner

*Primary Examiner*—Pierre E Elisca
(74) *Attorney, Agent, or Firm*—Harness, Dickey & Pierce, P.L.C.

(57) ABSTRACT

A method and a communications system are for billing of access-controlled programs and/or data, which are broadcast unidirectionally and encrypted from a broadcast transmitter and which are received by at least one receiving device. The programs and/or data broadcast encrypted are decrypted in the receiving device for access if received access conditions data for the access-controlled programs and/or data coincide with authorization data for the user. Clearing data from the central unit are thereby transmitted to a clearing module. The clearing data include billing data for the access to the unencrypted access-controlled programs and/or data as well as user data. The central unit makes available to the vendor information relating to the user data, in accordance with the received clearing data, which information is generated by the central unit according to specified conditions on further use.

29 Claims, 2 Drawing Sheets

Figure 1:
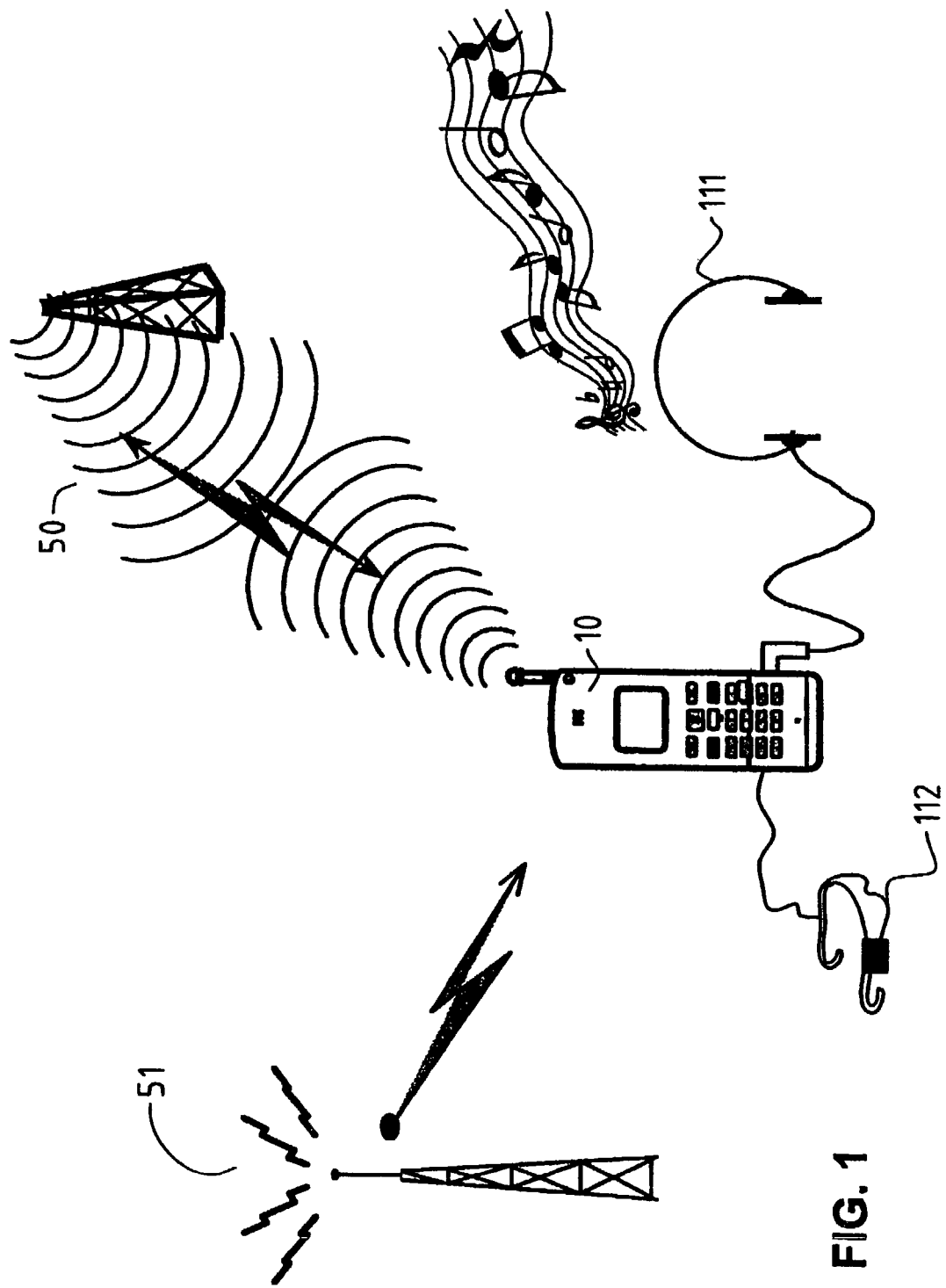

METHOD, COMMUNICATIONS SYSTEM AND RECEIVER DEVICE FOR THE BILLING OF ACCESS-CONTROLLED PROGRAMMES AND/OR DATA FROM BROADCAST TRANSMITTERS

The present invention relates to a method, a communications system and a receiving device for the billing of access-controlled programs and/or data, which are broadcast by a broadcast transmitter unidirectionally and encrypted. In particular, the present invention relates to a method, a communications system and a receiving device for the billing of access-controlled programs and/or data via a mobile radio network, especially a GSM, GPRS or UMTS network.

Worldwide at the present time broadcast systems with broadcast transmitters and broadcast receivers are being built in which digital audio, or respectively video, programs (television programs), and digital data, for example data for the execution of data services or program-accompanying data relating to the respective programs (Program Associated Data, PAD) or also data in general (Non Program Associated Data, NPAD) are broadcast unidirectionally by the broadcast transmitters, for instance by means of radio waves emitted by terrestrial or satellite-based transmitters, or via broadcast cable networks, and are received by corresponding broadcast receivers. Such broadcast systems are known, for example, by the designation Digital Audio Broadcasting (DAB), or respectively Digital Video Broadcasting (DVB). In particular, access-controlled programs and/or data can also be broadcast by means of these broadcast systems. Access-controlled programs and/or data are broadcast encrypted (scrambled), and can be received and decrypted (descrambled) by means of broadcast receivers by authorized users only. The unidirectional broadcasting feature of these broadcast systems has the drawback, however, that a backward channel is lacking from the broadcast receivers to the broadcast transmitters, or respectively to their operators, in particular with transmission by means of radio waves. Owing to this lacking backward channel, the possibilities for billing of access-controlled programs and/or data is limited. Access-controlled programs and/or data in these broadcast systems are generally billed in that subscriptions for various programs and/or data services are made out to interested users by the vendors, for example the operators of the broadcast transmitters, in exchange for subscription fees, for instance subscriptions to specific themes or programs, which can be purchased for a subscription period. Corresponding to the subscription, paid in advance or subsequently paid, authorization data for the subscribed-to services are loaded for the respective user in the broadcast receiver, for example through direct addressing via the broadcast channel or by means of a data carrier. This type of billing by subscription is particularly disadvantageous for the users when they would like to purchase access-controlled programs and/or data from several vendors, or respectively from several broadcast transmitters, since they have to take out subscriptions with several vendors. Billing by subscription is also disadvantageous for the users because they are not able to obtain spontaneously access-controlled programs and/or data for which they have not taken out any subscription. A further drawback of billing by subscription is that the vendors, or respectively the operators of the broadcast transmitters, receive no direct information about which subscribed-to services are actually availed of by the user. From the viewpoint of the users, billing by subscription moreover does not seem to be a fair billing method since they have to pay for subscriptions regardless of whether they have used the subscribed-to services or not. In particular for operators of smaller broadcast transmitters, or respectively smaller vendors of access-controlled programs and/or data, the expense for administration of such subscriptions and for billing such services is too costly. Another drawback of the state of the art is that, if information on user behavior is available at all to the vendor, it is only information, which is hard to obtain and the vendor gets it imprecisely. This makes it difficult for him to react quickly to user wishes or changed user behavior. Precise statistical data on user behavior and a simple, inexpensive billing system would bring a broadcast vendor advantages over his competitors, which can hardly be overestimated.

As prior art, there are further broadcast systems with a Set-Top-Box, which allows, for example the user identification with a separated mobile radio device on the mobile radio network, as showed in patent description DE19846452A1. For example, the user identifies himself with the mobile radio device on a mobile radio services provider who gives the permission to decrypt (descramble) the desired broadcasted programs after determination of the user access rights to the access controlled broadcasted programs of the Set-Top-Box. The prior art contains also such Set-Top-Boxes with integrated chip card reader. The charges of the user desired fee-based broadcasted programs are debited from an amount memorized on a chip card (Prepaid process). An example is described in EP0789337A2.

It is an object of the present invention to propose a new and better method, a new and better communications system as well as a new and better receiving device which are suitable for the billing of access-controlled programs and/or data broadcast unidirectionally and encrypted by a broadcast transmitter, and which in particular do not have the above-mentioned drawbacks.

These aims are achieved, according to the present invention, through the elements of the independent claims. Further preferred embodiments follow moreover from the dependent claims and from the description.

In particular, these aims are achieved through the invention in that access-controlled programs and/or data are broadcast unidirectionally and encrypted by a broadcast transmitter and are received by at least one receiving device, the encrypted broadcast programs and/or data being decrypted in the receiving device, for access to the access-controlled programs and/or data by a user of the receiving device, if received access conditions data for the access-controlled programs and/or data coincide with authorization data of the user,

- access request data for access to the access-controlled programs and/or data are transmitted from the receiving device to a central unit, at least a portion of the access request data being specified by the user on the basis of the received access conditions data,
- the central unit transmits at least portions of the authorization data to the receiving device in accordance with the transmitted access request data,
- clearing data are transmitted by the central unit to a clearing module of the central unit, which clearing data comprise billing data for the said access to the unencrypted access-controlled programs and/or data as well as user data, and which user data comprise information about the access, and
- the clearing module credits and/or debits services or payments to the vendor of the access-controlled programs and/or data as well as to the user, in accordance with the received clearing data, and/or makes available information to the vendor which information is generated by the central unit, based on the user data, in accordance with specified conditions on further use. The programs comprise, for example, digital audio and/or video programs.

The advantage of this invention is in particular that through the combination of the broadcast platform and a bidirectional communications platform, such as e.g. a mobile radio network, such as a GSM (Global System for Mobile communication) network, GPRS (Generalized Packet Radio Service) or UMTS (Universal Mobile Telephone System) network, the hardware and software components common to the two platforms can be used together, and one can profit at the same time from the advantages of the other platform in each case. Through the method presented here and the communications system corresponding to the method, the billing of access-controlled broadcast programs is greatly simplified. The simplification is accompanied by a high standard of safety against fraudulent intervention. Thus possible is the user identification in mobile radio networks, e.g. via the MSISDN (Mobile Subscriber ISDN) or IMSI (International Mobile Subscriber Identification) associated with the access. The unambiguous and secure user identification is especially important in the billing of the costs for the access-controlled programs and/or data. The transmission of the key for decryption of the encrypted access-controlled programs and/or data can take place via the communications network, without any further installations (hardware or software-side) being necessary on the part of the broadcast vendor. This makes it possible for the user to obtain spontaneously access-controlled programs and/or data, without his having to have taken out a subscription beforehand, and without the method having to necessarily set thereby any cost limits for the user. In particular, the spontaneous obtaining of access-controlled programs and/or data from a plurality of vendors, or respectively from different broadcast transmitters, is made possible for the user, without the user having to take out subscriptions therefore with all these vendors. For the vendors, or respectively the operators of the broadcast transmitters, the billing via a central unit means in addition a considerable relief, since they do not have to preoccupy themselves with either the administration of subscriptions or the itemized billing of the costs. Likewise one of the advantages is, in particular, that statistical user behavior can be recorded by the central unit, and can be made available to the broadcast vendor if it is in accordance with the conditions on further use determined with the users. A broadcast vendor is thus able to analyze and take note of user behavior easily and flexibly, and adapt the transmission plan of the broadcast transmitter easily and flexibly to the wishes of the users.

In one embodiment variant, for decryption of the access-controlled programs and/or data, in accordance with the received access request data, the central unit generates a data token, and transmits this token to the receiving device, a data token comprising in each case data that include at least portions of a corresponding key to the access-controlled encrypted programs and/or data, or an access authorization for a key for decryption of access-controlled programs and/or data. The data token can likewise be encrypted (e.g. also via public key cryptography, such as, for instance also SSL (Secure Sockets Layer), HTTPS, etc. or can be signed electronically. The advantage that the key for decryption of the access-controlled data and/or programs can be stored and called up centrally lies in that, among other things, the broadcast vendors are able to change the key as often as desired, e.g. with respect to time or for different data records of the access-controlled encrypted programs and/or data. If the vendor changes his key, then he needs to update the key at one central place only. The user can access just one film of a broadcast vendor, for example, without, among other things, having to take out a subscription with the vendor.

In an embodiment variant, the access request data comprise at least certain of the conditions on further use of the user data, which at least certain conditions on further use are specified by the user via the input elements of the receiving device. An advantage of the embodiment variant is that the user has control over the user data, further used by the central unit, which describe e.g. his user behavior. It is also conceivable with this embodiment variant that the vendor pays the user for the use of the user data. For instance, the viewing of a transmission channel with advertising over a certain time period by the user could be compensated by free admission to a video film or something similar. This has not been possible so far in the state of the art.

In a further embodiment variant, the access conditions data comprise cost parameters, which include cost amounts for the access to the access-controlled programs and/or data per unit of calculation. Units of calculation are, for example, whole program units such as, for instance, entire video films, units of time, quantities of transmitted data, etc. This embodiment variant has the advantage, among other things, that a vendor can ask fees of different amounts for different access-controlled programs and/or data, which are transmitted, for instance, shifted with respect to time over a broadcast channel. Through this embodiment variant, there also exists the possibility that the explicit consent of the user can be required each time for access to various access-controlled programs or data that are subject to charges. This increases the protection of the user against unforeseen costs.

In an embodiment variant, the billing data comprise billing parameters for debiting or crediting monetary amounts to the user and/or vendor according to the access-controlled programs and/or data obtained. The billing parameters are, for example, starting and ending time or duration as well as the costs per time unit of the programs and/or data obtained, or more generally the number of units of calculation and the costs per unit of calculation for the programs and/or data obtained. This embodiment variant has the advantage, among other things, that the costs or credits for the access to the access-controlled encrypted programs and/or data can be carried out in a controllable way for the user and moreover by a clearing system, independent of the vendor, for example. This gives the user protection against fraudulent debits by the vendor. In particular, the variable possibilities of credits and debits on both sides, i.e. on the side of the user as well as on the side of the vendor, for individual services or payments, can result in completely new possibilities for use of a broadcast transmitter. Thus through the possibility of reciprocal debiting and/or crediting of services or payments, games, such as e.g. games involving money, lotteries, etc. can also be carried out via the broadcast channel, for example.

In a further embodiment variant, in billing the said access by the central unit, the debiting and/or crediting has the monetary value of 0. This has the advantage, among other things, that the payment for the access to the access-controlled programs and/or data does not necessarily have to include debits or credits of monetary amounts. For example, instead of entailing compensation with monetary amounts, the consent of the user to further use of the user data by the vendor can be in the access request data specified by him.

In a further embodiment variant, during the access to the access-controlled programs and/or data, at least parts of the clearing data are transmitted by the receiving device to the central unit before, after or periodically during the access to the access-controlled programs and/or data. The periodic transmission can, for instance, take place via GSM/SMS (Short Message Service), GSM/USSD (Unstructured Supplementary Service Data), GPRS or UMTS. This has the advantage that, for example, the viewing of a video film can be interrupted at any point in time, and it is possible to calculate the costs for the already consumed time only. The transmission before access, on the other hand, has the advantage that after receiving the data token with the key or an access authorization to a key for decryption of the desired access-controlled programs and/or data, no further communication between the central unit and the receiving device is necessary. Thus it is conceivable that a user can have a key with access request data made and can pass the key on to another user.

In an embodiment variant, a monetary value is stored in a data memory of the receiving device, costs for the access to the access-controlled programs and/or data are determined in the receiving device based on the cost data of the received access conditions data, and clearing data are transmitted to the central unit if the added up costs for access exceed the stored monetary value, or a whole multiple of the stored monetary value, and/or a predetermined time window has expired. This embodiment variant has the same advantages as the preceding embodiment variant.

In an embodiment variant, the clearing data transmitted from the receiving device to the central unit comprises data, which are specified by the user before the transmission. This has the advantage that the user can give, for example, criticism, an evaluation, or comments on a film, program or the transmission plan, etc. An indirect bidirectional communications possibility between the user and the vendor is thus created via the platform of the clearing unit.

In a further embodiment variant, the vendor of the access-controlled programs and/or data changes the transmission plan for the broadcasting of access-controlled programs and/or data in accordance with user data. The change can take place manually or automatically. One advantage of the embodiment variant is that the user is given a direct influence upon the transmission plan through his user behavior (e.g. through anonymous, statistically evaluated user data or user data from a particular user, such as, for instance, the direct ordering of, or the wish for, a particular access-controlled program and/or data). The vendor can take into consideration, for example, the customer behavior and customer wishes in a flexible way, e.g. transmit films of a particular kind more frequently (e.g. love stories or adventure films, etc.) if they are accessed more frequently by the users.

In a further embodiment variant, the access request data comprise data specifiable by the user via input elements of the receiving device, with which data the user indicates to the vendor individual wishes and/or orders for the transmission of particular access-controlled programs and/or data. One of the advantages of this embodiment variant is that the user can have direct influence on the transmission plan of the broadcast provider, e.g. in a way similar to the popular wish concerts of radio transmitters. Another example of an advantage is that, with the method, access to personified multimedia data, among other things, can be achieved in that the user places his order in the access request data, after which the vendor includes the desired programs and/or data in his transmission plan, and the user receives the corresponding key transmitted by the central unit.

In a further variant, billing records are generated in the receiving device and stored in a data memory of the receiving device in a way so as to be able to be called up by the user, which records contain information relating to the costs for the access to the access-controlled programs and/or data and/or an identification of the vendor of these access-controlled programs and/or data. One of the advantages of this embodiment variant is that the user can administer the fees for his access, for example, individually and self-sufficiently in the receiving device, or, if he transmits the billing records, via an interface, to an external computing unit, in this computing unit. Another advantage of the generating and storing of billing records is that a subsequent bookkeeping and invoicing of the costs for the access to the access-controlled programs and/or data is thereby made possible.

In an embodiment variant, the said information and/or billing records are stored in a data memory, which is integrated into a chip card that is removable from the receiving device. The advantage of storing the monetary value and/or the billing records in a data memory removable from the receiving device is that, on the one hand, these data can be made accessible to external data processing means outside the receiving device, without the aid of additional communications means in the receiving device, and, on the other hand, that several users can use the same receiving device in a user-specific way by inserting their own data memory into the receiving device, or in that a user can insert different data carriers for different purposes into the receiving device, e.g. for private and/or business use or for different themes.

In a further embodiment variant, the programs comprise digital audio and/or video programs. This embodiment variant has the same advantages as the embodiment variants further above.

In an embodiment variant, the receiving device comprises a mobile radio device, which communicates with the central unit via a mobile radio network. In this embodiment variant, the mobile radio device is equipped with broadcast receivers, e.g. with a VRD (Virtual Retinal Display). One of the advantages of this embodiment variant is that the user can move freely and obtains access to broadcast transmitters independent of location.

In an embodiment variant, a monetary value is stored in a data memory of the receiving device, costs for the access to the access-controlled programs and/or data are determined in the receiving device based on the cost data of the received access conditions data, the decryption of the access-controlled programs and/or data is prevented in the receiving device if the determined costs are greater than the stored monetary value, and the costs for the access to the unencrypted access-controlled programs and/or data are deducted from the stored monetary value. This embodiment variant has the advantage, among other things, that the user is not surprised by costs about which he was too little aware beforehand. The embodiment variant is suitable also for parents who wish to allow their children to obtain access-controlled programs and/or data only up to an amount limit, for example.

In an embodiment variant, the said data memory for storing the monetary value is a removable, reloadable chip card. One of the advantages of this embodiment variant is that the monetary amount can be reloaded or loaded with a reload amount through a data terminal. The reload amount corresponds, for example, to a monetary amount, paid in advance, determined by the user, which is debited to the user on a bank account, for instance, or a credit card account (credit card number), or which is paid by the user in cash at the data terminal (e.g. prepaid cards). The advantage of this embodiment variant is that it can be achieved on the basis of numerous, already existing, linked data terminals, e.g. automatic banking machines or ticket machines.

One embodiment of the present invention will be described in the following with reference to an example. The example of the embodiment is illustrated by the two attached FIGS. 1 and 2. Shown is a schematic diagram illustrating a communications system with a broadcast transmitter, a receiving device as well as a central unit with clearing module. FIG. 1 shows only the receiving device with broadcast channel and communications channel to the central unit.

Figure 2:
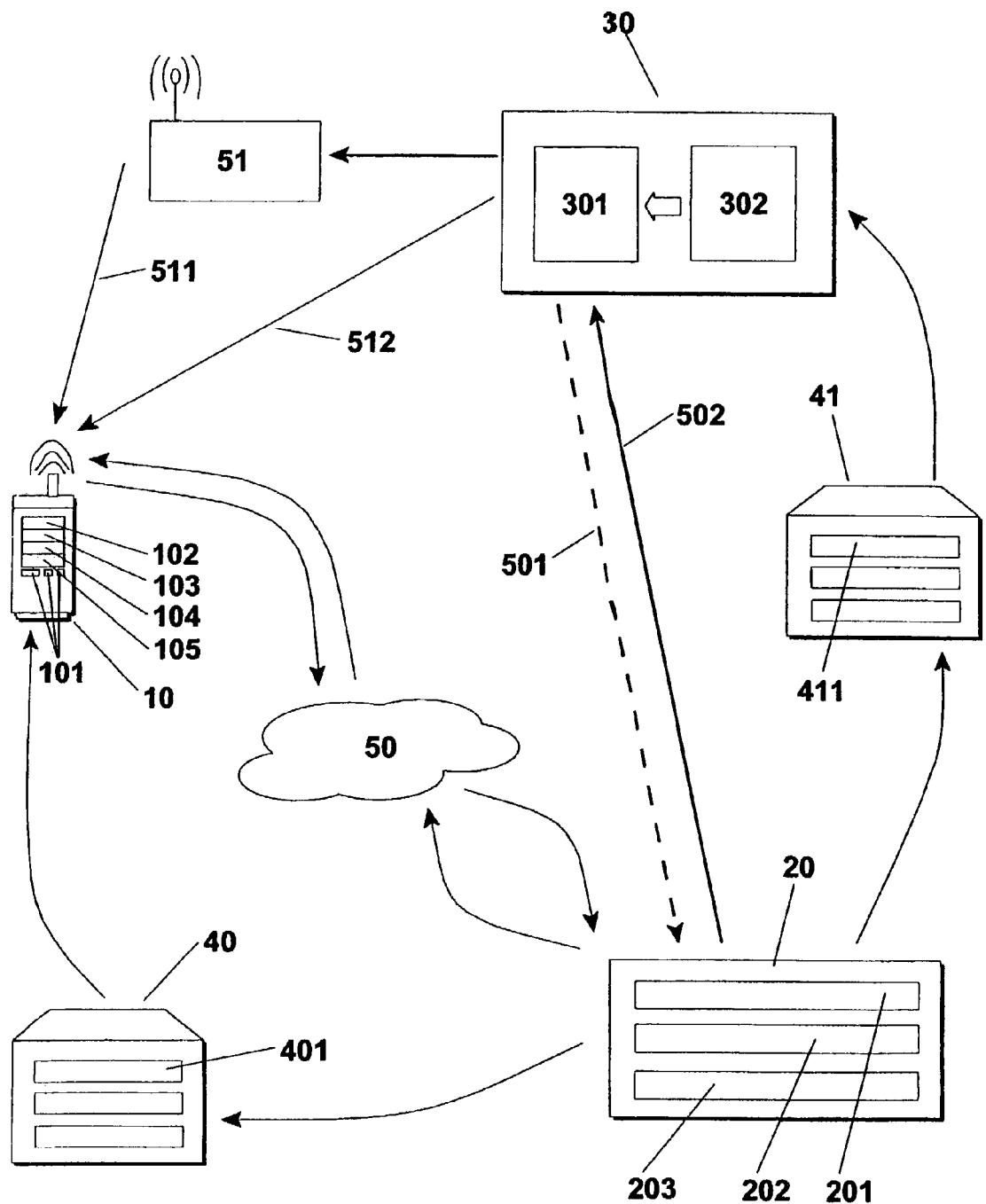

In FIGS. 1 and 2, a broadcast receiver 30 broadcasts programs and/or data unidirectionally to receiving devices 10, for example by means of radio waves from a terrestrial or satellite-based broadcast transmitting antenna 51 via an air interface 511, or via broadcast cable networks 512. Designated by the reference numeral 30 are also the vendors of these programs and/or data. The vendor can likewise include the various aspects in their common differentiation, such as the broadcast content provider (responsible for the transmission program), the broadcast service provider (packaging, etc.) and the broadcast network provider (broadcasting, responsible for conditional access, etc.). Meant by the programs and/or data are, for example, digital audio, or respectively video programs (television programs), and digital data, for example data for the execution of data services or program-accompanying data relating to the respective programs (Program Associated Data, PAD), or also data in general (Non Program Associated Data, NPAD). Thereby meant in particular are also multimedia data, e.g. in the MPEGX (especially MP2/MPEG7) standard, as defined by the Moving Picture Experts Group. For better clarity it should be mentioned here, however, that several different vendors can also broadcast their programs and/or data over a common broadcast transmitter 30. A receiving device 10 is equipped with a broadcast receiver 103, by means of which the programs and/or data broadcast by the broadcast transmitter 30 can be received over broadcast channels, for example over the broadcast cable network 512 or by means of a receiving antenna as radio waves via the air interface 511.

Broadcast systems with such broadcast transmitters and broadcast receivers are known, for example, by the designation Digital Audio Broadcasting (DAB), or respectively Digital Video Broadcasting (DVB). The standard ETS 300 401, "Radio broadcasting systems; Digital Audio Broadcasting (DAB) to mobile, portable and fixed receivers" was defined by the European Telecommunications Standards Institute (ETSI), F-06921 Sophia Antipolis Cedex, France, for the Digital Audio Broadcasting (DAB) system, which was developed for the transmission of high quality digital audio programs and/or data services for reception by means of mobile, portable and fixed, installed terminals from terrestrial or satellite-based transmitters 30, or from broadcast cable networks 512. The content of this document ETS 300 401 relating thereto, which was published by the ETSI in the second edition in May 1997, as well as the content of the standard document ETS 300 174 "Network Aspects (NA); Digital coding of component television signals for contribution quality applications in the range 34-45 Mbits/s," which was published in November 1992 by the ETSI, are hereby incorporated in this text by reference. Also defined in the above-mentioned ETSI standards is a Fast Information Channel (FIC) by means of which a quicker access to information is made possible for a broadcast receiver 103. Multiplex Configuration Information (MCI), for example, and also service information and data for data services are transmitted over the FIC channel.

In order to limit the access to individual services or a plurality of services or service components to authorized users (in connection with DAB these services and service components are audio programs and/or data (services) in connection with DVB video, or respectively television programs, and/or data (services)), mechanisms are defined in the above-mentioned ETSI standards for access-controlled programs and/or data (services), the so-called conditional access. Described in particular in the above-mentioned ETSI standards are scrambling/descrambling procedures (encryption/decryption), parameters for the signaling and synchronization of the conditional access as well as mechanisms for the control and distribution of authorizations (authorization data for users) through the transmission of so-called ECM messages (Entitlement Checking Messages) and EMM messages (Entitlement Management Messages) over the broadcast channels (broadcast cable network 512 or air interface 511). According to the above-mentioned ETSI standards, a conditional access flag and/or conditional access identifier is used for each of the service components transmitted over the broadcast channels 511/512 in order to indicate to the broadcast receiver 103 whether the respective service component uses conditional access mechanisms or not, and, if applicable, which type of mechanisms are used. For service components, which are in a controlled access mode and which are designated in this text as access-controlled programs and/or data, the data of the respective service component (which component can relate to the programs and/or data) are encrypted with a control word, this control word being changed regularly, and for its part being transmitted to the broadcast receivers 103 encrypted through a session key (key) in the ECM messages. Identified by the conditional access identifier, according to the above-mentioned ETSI standards, is the access control module 105, the so-called access control system, used for all service components of a service, which access control system can interpret and process the ECM and EMM messages transmitted by the broadcast transmitter 30.

The session key (key) used for encryption of the control words is stored as secret information in the access control system, according to the above-mentioned ETSI standards. Session keys (keys) can be transmitted to broadcast receivers 103 in EMM messages, whereby, for the transmission, they are encrypted themselves by a distribution key. According to the above-mentioned ETSI standards, authorizations (authorization data) are transmitted to broadcast receivers 103 in the EMM messages, different kinds of authorizations being defined which correspond to different types of subscriptions: subscriptions for a theme, a level or a class, reservation in advance with payment per program, or spontaneous payment per program, per service or per time unit. According to the above-mentioned ETSI standards, the EMM messages can be transmitted to a specific customer (user) identified through an unambiguous address, to a small group of customers (users) identified by a group address, to a large group of customers (users) identified by a collective address, or to all customers. Since the content of the EMM messages, in particular the authorizations, does not have to be transmitted to the broadcast receivers 103 in real time, this content can be transmitted to the broadcast receivers 103 in another way, for example stored on a data carrier, in particular a chip card, instead of by means of EMM messages. According to the above-mentioned ETSI standards, the customer addresses are stored in the access control system (access control module 105), and are transmitted by the access control system to the EMM receiving module (not shown), responsible for receiving EMM messages, of the broadcast receiver 103, so that this EMM receiving module passes on only those EMM messages to the access control system which contain a customer address that coincides with one of the customer addresses received from the access control system. So as not to overburden the access control system unnecessarily with messages, the broadcast receiver 103 comprises hardware or software filters, which pass on to the access control system only those messages which can and have to be interpreted and processed by the access control system; for example, messages, as mentioned above, are filtered on the basis of customer address and repeatedly transmitted messages are filtered.

According to the above-mentioned ETSI standards, in addition to secret codes for the decryption (descrambling), the conditions (access conditions data) are transmitted to the broadcast receivers 103 in the ECM messages, which conditions are to be fulfilled in order to obtain access to conditional access services. The ECM messages contain all information specifying the conditions for access to a service, e.g. an audio program or a data service. Customers with differing authorizations can therefore access a service. According to the above-mentioned ETSI standards, depending upon available service access, the following parameters can be contained in the ECM messages: (1) program provider identifier, identifies the vendor who has generated the ECM message. (2) broadcast date and program theme/level, if the program, that means the service, is available in the subscription for a theme/level. (3) broadcast date and program class, if the program, that means the service, is available in the subscription per link. (4) program number, if the program, that means the service, is available with pre-reservation and payment per program. (5) program number and program costs, if the program, that means the service, is available for spontaneous payment per program. (6) program number and costs per time unit of the program, if the program, that means the service, is available for spontaneous payment per time unit per program. If the authorizations meet the conditions, which are to be fulfilled to obtain access to conditional access services, the session key (key) of the access control system can be used to decrypt the control word. Then the data of the respective service components can be decrypted with the control word.

In the present invention, for the access to access-controlled programs and/or data by a user of the receiving device 10, the encrypted broadcast access-controlled programs and/or data are decrypted in the receiving device 10 if access conditions data, received over the broadcast channel 511/512, for the access-controlled programs and/or data coincide with authorization data of the user. As was mentioned above, cost data can also be transmitted by the broadcast transmitter 30 to broadcast receivers 10 in the ECM messages, namely program costs for access-controlled programs and/or data, which are available for spontaneous payment per service, and/or costs per time unit or unit of calculation for access-controlled programs and/or data which are available for spontaneous payment per time unit or unit of calculation and per service. A unit of calculation can be, for example, a unit of time, a logical unit, such as e.g. a whole video film or an entire music piece, etc., or a quantity of transmitted data. Besides costs, the received access conditions data can also comprise, however, any other desired conditions for access to the access-controlled programs and/or data. Thus they can also contain conditions on further use of user data, which user data will be described more precisely further below. For example, a condition of further use of user data can specify, for example, that if the user lets his user data or portions of his user data be used by the broadcast vendor, he has lower costs to pay for the access to the access-controlled programs and/or data, or even obtains credits for the access (e.g. to an advertising channel). User data can comprise, for example, an unambiguous identification of the user, personal particulars or his access behavior with respect to access-controlled programs and/or data. The unencrypted programs, or respectively data, i.e. in particular the access conditions data, can be reproduced for the user of the receiving device 10, for instance via a processing module of the receiving device and from there via electroacoustical converters, or respectively display units. Before reproduction for the user, entailing costs, a corresponding confirmation is optionally requested from the user by the receiving device 10 (for instance an option that can be configured by the user), for example through a corresponding software module, via the display or acoustical output unit 111/112, for instance, as mentioned, giving the costs for the access to the respective access-controlled programs and/or data, and/or conditions of further use of user data, and the confirmation given by the user via the input elements 101. The input elements 101 can comprise, for example, keyboards, graphic input means (mouse, trackball, eye-tracker with Virtual Retinal Display (VRD), etc.), but also IVR (Interactive Voice Response), etc.

According to the present invention, the receiving device 10 is connected bidirectionally to a central unit 20 via a network 50. The connection between the central unit 20 and the receiving device 10 also comprises a protected channel (security channel) or respectively the security mechanisms necessary for the protection (encryption, limited time window, electronic signatures, etc.) in the central unit 20 and the receiving device 10. The download mechanisms for the receiving device can also comprise DAB/MExE applets. The receiving device 10 can be especially a mobile radio device, equipped with a broadcast receiver 103, which is connected to the central unit 20 over a mobile radio network, for example a GSM, GPRS, UMTS network or another—especially satellite-based—mobile radio network, or a fixed network, for instance an ISDN network, the public switched telephone network, or an IP network (in particular the Internet). In order to obtain authorization data for a particular access to access-controlled programs and/or data, access request data are transmitted from the receiving device 10 to the central unit 20. The user has the possibility of determining himself at least a portion of the access request data, based on the received access conditions data. This can take place, for example, in that the user is requested by the receiving device to give his consent to the access conditions or to part of the access conditions via an interface. The access request data definable by the user can be specified via input elements 101 of the receiving device 10, for example. The access request data are checked in the central unit 20, and the central unit 20 transmits at least portions of the authorization data to the receiving device 10, in accordance with the transmitted access request data. Together with the authorization data, a key for decryption of the access-controlled programs and/or data can also be transmitted to the receiving device 10 by the central unit 20, in accordance with the received access request data. The central unit 20 can, for example, generate a data token and transmit it to the receiving device 10, a data token comprising in each case data about a corresponding key to the access-controlled encrypted programs and/or data or an access authorization for a key for decryption of access-controlled programs and/or data. Clearing data are likewise transmitted from the receiving device 10 to the central unit 20. At least parts of the clearing data can be transmitted before, after or periodically during the access to the access-controlled programs and/or data from the receiving device 10 to the central unit 20. It is also conceivable for the access request data to include the clearing data. The clearing data are transmitted by the central unit 20 to a clearing module 201 of the central unit. The clearing data comprise billing data for the said access to the unencrypted access-controlled programs and/or data as well as user data. The user data comprise information in accordance with the access, such as, for instance, an unambiguous user identification, type and duration of the access to the access-controlled data, etc. The user data can also contain indications about the respective access-controlled programs and/or data, for example a program number, indications about the program theme, the program level and/or the program class and/or a currency indication. In connection with the currency indication, it should also be mentioned moreover that not only can various currencies be supported for the monetary values, but points according to a defined point system can also be used and supported for the monetary values, e.g. a loyalty point system, these points being treated like a currency. The user data contain in addition an indication of the vendor and/or of the broadcast transmitter of the respective access-controlled programs and/or data. The identification of the user of the receiving device 10, as already mentioned, can also be contained in the user data, which user identification corresponds, for instance, to the above-mentioned unambiguous customer address, or which user identification corresponds to another user identification for another system, for instance an International Mobile Subscriber Identity (IMSI), or a MSISDN (Mobile Subscriber ISDN) which serves for identification in a mobile radio network, and which user identification is stored, for example, in a chip card, e.g. an SIM card (Subscriber Identification Module). In accordance with the received clearing data, services or payments are credited and/or debited to the vendor of the access-controlled programs and/or data as well as to the user by the central unit 20, and/or information is provided to the vendor relating to the user data, which information is generated by the central unit 20 according to specified conditions on further use. The clearing data are electronically signed, for example, and are stored in a stack in the receiving device 10. The electronic signature verifies, for example, the hardware or software module which generates the clearing data, and/or the receiving device 10 and/or the respective user of the receiving device 10 and/or the communications module 104 as authentic producer(s)/source(s) of the clearing data. The electronic signature is based, for example, on a certificate issued by a certifying unit, for instance a Trusted Third Party (TTP).

The connection between the receiving device 10 and the central unit 20 can take place via various data channels, and not only directly over the described communications networks 50. The data can be transmitted between the receiving device and the central unit, for example also via an interface (e.g. a wireless interface such as an infrared interface or bluetooth) to a data terminal, and from the data terminal via a communications network, or by means of a chip card, removably inserted in a data terminal, of the receiving device via this data terminal and a communications network to the central unit. In the preferred embodiment variants, however, the receiving device 10 and the central unit 20 each comprise a communications module 104/202. By means of the communications modules, data can be exchanged over the communications network 50. The communications network 50 comprises, for example, as already mentioned, a mobile radio network, for instance a GSM, GPRS or UMTS network or another—for example satellite-based—mobile radio network, or a fixed network, for example an ISDN network, the public switched telephone network, a TV or radio cable network, or an IP network (Internet Protocol). In particular in receiving devices 10 designed as mobile devices, the communications module 104 comprises a mobile radio module for communication over the mobile radio network 50. By means of the communications module 104, the above-mentioned clearing data in particular can be transmitted to the central unit, for example periodically (e.g. with GSM/SMS, GSM/USSD, GPRS or UMTS) or in each case upon reaching a defined value of a monetary amount or a defined time window. Upon reaching the predefined value, the solvency of the respective user, for example, can also be checked by the central unit 20 at a financial institution 40. The predefined value of the monetary amount can be stored, e.g. in a data memory of the receiving device 10. The crediting or respectively debiting can take place before or after (prepaid/postpaid) the reaching of the monetary value. In the latter variant, the stored monetary value corresponds to a credit limit, which, depending upon option, is set by the central unit 20, for example, or respectively by the clearing module 201. The calculation of the costs and their comparison with a predefined monetary value is carried out by a costs recording module of the receiving device. Based on the cost data of the received access conditions data, this module calculates the costs for the access to the access-controlled programs and/or data. The costs recording module is, for example, a programmed software module that is implemented on a processor of the receiving device 10 or on a chip card, or is a module implemented in hardware. In the embodiment variant with the chip card, the chip card can be, for example, a multifunctional SIM card taking into consideration the MEXE (Mobile Station Application Execution Environment) specifications.

The billing data of the clearing data can comprise billing records (e.g. electronically signed), similar to CDR records (Call Data Records) as so-called DUR records (DAB/DVB Usage Records), which are transmitted via the central unit 20 to the clearing module 201. It should likewise be mentioned that the clearing module 201 does not necessarily have to be integrated into the central unit 20, but can, as a separate unit, be connected together with the central unit over a communications network. If the clearing data comprise billing data with billing parameters for debiting or crediting monetary amounts to the user and/or the vendor according to obtained access-controlled programs and/or data, the costs for the access are calculated by the central unit 20, and the clearing of the monetary amounts via the monetary institution 40/41 credited to the corresponding accounts 401/411 (thus with the user sponsoring is also possible, for example) or debited. This can also take place before, after, or at certain intervals (e.g. periodically) during the access of the user to the access-controlled data. The debiting and/or crediting during the billing of the said access by the central unit 20 can also have the monetary value of 0. The user can also receive credited monetary amounts or other items, however, through the viewing of a broadcast block of advertising, for example.

The user data are filtered and/or statistically evaluated by the central unit 20 in accordance with conditions on further use, and then made available to the vendor. As already mentioned, the conditions on further use can be definable by the user, or can correspond to other agreements (e.g. made beforehand or legal guidelines). In addition to the user data, the clearing data can also comprise data that can be determined by the user before transmission of the clearing data. These data can be entered by the user, e.g. via the input elements 101 of the receiving device 10. It is thereby possible for the user, e.g. following access to a video film or a special broadcast, to make suggestions, express criticism, etc. on this film to the central unit 20 via the aforementioned data definable by the user. These data too are filtered by the central unit and/or evaluated statistically, and are made available to the vendor. Such feedback can be compensated for, on the part of the vendor, through credits of monetary amounts or other services or payments (e.g. free access to a special service). In other words, since both the connection of the central unit 20 to the receiving device 10, as well the connection between the central unit 20 and the vendor 30 can have a backward channel, the central unit can serve as the central administration and communications hub for vendors and users, it being possible to ensure the desired data protection or the desired anonymity of the user through the conditions on further use. This has many advantages, and opens up new possibilities for the use of broadcast transmitters. For example, it is also possible thereby to play the most various games, or have them started, such as, e.g. games of chance, lotteries, etc. with the aid of a broadcast transmitter.

As embodiment variant, the receiving device 10 can have one or more interfaces, in particular a device interface, for instance a contact less interface, e.g. an infrared interface, for example a High Speed Infrared (HSIR) interface or an IrDA (Infrared Data Association) interface, an inductive interface, for example a Radio Frequency Identification (RFID) interface, a Home RF (Radio Frequency) interface, a Digital European Cordless Telecommunications (DECT) interface or another Cordless Telecommunications System (CTS) interface, or a high frequency radio interface, for example a so-called "Bluetooth Interface." Via such an interface, the receiving device 10 can exchange data with external data terminals, outside the receiving device 10, which have a corresponding interface. In particular, the above-mentioned access request data and/or user data and/or clearing data can be transmitted to the data terminal via the interface and can be sent by the data terminal to the central unit 20 over a communications network 50. Furthermore the confirmation of the receipt of the data, for example, can also be received via the interface, for instance directly from the central unit 20.

It is conceivable, as an embodiment variant, that the access request data and/or the authorization data and/or the clearing data are stored on a removable chip card or another storage medium of the receiving device. Thus the billing records can be read by an external data terminal outside the receiving device 10, by the chip card being inserted into the card reading/writing device of the data terminal. The data can then be sent by the data terminal over a communications network 50 to the central unit 10. The confirmation of receipt of the data can likewise be transmitted onto the chip card. The data terminal is preferably a data terminal accessible to the public, for example an automatic banking machine, a ticket machine or a point-of-sale device.

The central unit checks the clearing data received over the communications network with respect to authenticity of the sender, or respectively of the producer or the source of the clearing data, for example the authenticity of the communications module 104 (e.g. with GSM/UMTS via the MSISDN or IMSI) and/or the hardware or software module of the receiving device which has generated the clearing data, e.g. based on an electronic signature of the clearing data. For authentic clearing data, monetary amounts, based on the billing data contained therein, are credited and/or debited to vendors identified by the vendor identification(s) contained in the billing data. Then transmitted to the vendor by the central unit 20 over the communications network 50 is information, as already described, relating to the received billing records and/or statistical information relating to the access to the access-controlled programs and/or data and/or further user data, if agreed upon in the conditions on further use.

If it is noted in the central unit 20 that monetary values issued, or respectively administrated, by the central unit have not been billed within a predefined time period, e.g. one or more years, through clearing data received over the communications networks 50, these monetary values can be allocated to the vendors by the central unit based on statistical information relating to the access to access-controlled programs and/or data. The central unit 20 comprises, for example, one or more communications servers as well as a database for storing the issued monetary values and reload amounts, for storing the received clearing data, and for storing information relating to the vendors, or respectively operators of broadcast transmitters 30.

It must be mentioned here that in an embodiment of the present invention, the billing, i.e. the whole crediting/debiting according to the billing records, can also be achieved with a reload amount stored on a removable chip card. This concerns in particular prepaid or post-paid variants of the billing for access-controlled programs and/or data, broadcast-by-broadcast transmitters 30. In one variant, the monetary value, mentioned further above, stored in a data memory (e.g. such a removable chip card, etc.) of the receiving device 10 is a credit limit, which, depending upon option, is set by the central unit 20, for example, or respectively the clearing module 201, for instance after checking the solvency of the user. With the credit limit variant, the actual costs for the access to the unencrypted access-controlled programs and/or data are debited or invoiced to the respective user, identified by a user identification contained in the clearing data, only after the transmission of the clearing data to the central unit 10 or to another billing system. Prepaid monetary values, or respectively reload amounts, can be issued, for example, in the form of anonymous prepaid cards, which can be inserted into one of possibly several card insertion locations of the receiving device 10, in exchange for direct payment (cash, credit card) or corresponding debiting of an account. Prepaid or respectively post-paid monetary values can be loaded in the receiving device 10 for an identified user, for example after completed solvency check, as described above, also through debiting of an account or by invoice. An advantage of the receiving devices 10 which are equipped with the communications module 104 for direct communication with a central unit 20 is that the billing of costs can take place through transmission of clearing data by means of the communications module 104 to a billing or clearing module 201, without monetary values having to be stored, checked or debited in the receiving device 10.

The embodiment variant with the prepaid or post-paid amount stored in a data memory or the amount as credit limit can be achieved as embodiment example in such a way that a monetary value is stored in a data memory, which cannot be written in by the user, of the receiving device 10, which monetary value corresponds to a prepaid monetary amount or a credit limit. The data memory is installed in the receiving device 10 in a fixed way, or it is located on a data carrier of the receiving device 10, for example a chip card, which data carrier can be removed from the receiving device 10 by the user. The monetary value is loaded into the data memory, for example via the broadcast channels 511/512 or over a communications network 50, for instance a mobile radio network, e.g. a GSM, GPRS or UMTS network or another—e.g. satellite-based—mobile radio network, or a fixed network, for instance an ISDN network, the public switched telephone network, or an IP network (in particular the Internet). If the memory is located on a chip card, the monetary amount can be loaded by means of a card reading/writing device into which the chip card is inserted.

The access control module 105 (access control system) is equipped with a supplementary credit control module. The credit control module prevents the decryption of access-controlled programs and/or data if the costs to be paid, calculated by the costs recording module, are greater than the monetary value stored in the data memory. The comparison operation with respect to the calculated costs and the stored monetary value can thereby be carried out by the credit control module, or, to lessen the burden upon the access control module 105, it can be carried out outside the credit control module, for example in hardware, so that the credit control module can be reduced to the function of checking the results of the comparison operation, for example. Functions and operations of the access control module 105 can be carried out, for example, in parallel (simultaneously) with the functions and operations of the costs recording module. For example, the costs recording module can determine the costs for the access to the respective access-controlled programs and/or data on the basis of the cost data received in the ECM messages, and store the result of the comparison operation (for instance, "1" for sufficient credit, "0" for insufficient credit) in a memory location accessible to the access control module 105, while the access control module 105 determines the authorization of the user for access to the respective access-controlled programs and/or data on the basis of the access conditions data received in the ECM messages and the authorization data, transmitted or stored in the receiving device 1, and afterwards, with existing authorization, checks the result of the comparison operation determined by the costs recording module. If it was determined, through the comparison operation, that the credit of the user is sufficient, the key (session key), transmitted with the authorization data or stored in the receiving device 10, is released by the access control module for the decryption of the control word received in the ECM messages, and the decryption of the encrypted access-controlled programs and/or data by the decryption module 102 is thereby made possible. If it was determined, through the comparison operation, that the credit of the user is not sufficient, the key (session key) stored in the receiving device 10, or transmitted with the authorization data, is not released by the access control module 105 for the decryption of the control word received in the ECM messages, and the decryption of the encrypted access-controlled programs and/or data by the decryption module 15 is thereby prevented.

To support various access control modules 105 with or without supplementary credit control module, various conditional access identifiers can be defined and used, for example. Thus the credit control can be carried out in such a way that credit condition values, specifying a minimum monetary value for access to access-controlled programs and/or data, are transmitted as access conditions data to the receiving device 10 in the ECM messages, an authorization amount value, corresponding to a prepaid monetary amount or a credit limit, is stored in the receiving device 10 as part of the authorization data, and the credit control module compares received credit condition values with received or stored authorization amount values before the access to the key (session key) is released for decryption of the access-controlled programs and/or data. As a further function of the costs recording module, the costs for successful access to the unencrypted access-controlled programs and/or data are deducted from the monetary amount stored in the memory or respectively added in the memory.

Finally, it is to be pointed out that the distribution of executable functions and to-be-stored data elements among fixed, installed memories and processors in the receiving device 10, or respectively memories and processors of the mentioned chip card, removable from the receiving device 10, can be carried out, for example, taking into consideration the specifications of the Mobile Application Execution Environment (MEXE, GSM 02.57 and GSM 03.57). By means of suitable synchronization mechanisms, data elements can be stored on the chip card, and copied into fixed, installed memory locations in the receiving device 10, where they are available for real-time operations, upon insertion each time of the chip card into the receiving device 10. Changed values of the data elements stored in the fixed, installed memory locations can be updated on the chip card, for example, through a parallel process. One skilled in the art will understand that in particular confidential data exchanged between processes, distributed among a plurality of processors, are transmitted in a protected way in each case for security reasons.

LIST OF REFERENCE NUMERALS

10 receiving device
   101 input elements
   102 decryption module
   103 broadcast receiver
   104 communications module
   105 access control module
   111 acoustical output unit
   112 display unit
20 central unit
   201 clearing module
   202 communications module
   203 access administration module
30 broadcast transmitter
   301 transmission plan module
   302 recording module for user behavior
40 financial institution
   401 useraccount
41 financial institution
   411 vendor account
50 communications network
   501 communications channel
   502 communications channel
51 broadcast transmission antenna
   511 air interface
   512 broadcast cable network

The invention claimed is:

1. A method for selective billing at least one of a plurality of access-controlled programs and data, which are broadcast unidirectionally and encrypted by a broadcast transmitter, comprising:

receiving a selected one of the plurality of access-controlled programs and data by at least one mobile receiving device, the selected one of plurality of programs and data being decrypted in the mobile receiving device upon received access conditions data for the at least one of the plurality of access-controlled programs and data coinciding with authorization data of the user of the mobile receiving device;

transmitting access request data, for access to the at least one of the plurality of access-controlled programs and data, from the mobile receiving device over a mobile radio network to a central unit, at least part of the access request data being specified by the user on the basis of the received access conditions data;

transmitting, via the central unit, at least part of the authorization data over the mobile radio network to the mobile receiving device in accordance with the transmitted access request data, transmitting clearing data based on the data of the mobile receiving device, via the central unit, to a clearing module, wherein the clearing data includes billing data for the access to the selected one of the plurality of access-controlled programs and data, as well as user data, and wherein the user data includes information about the access;

at least one of crediting and debiting, via the clearing module, at least one of services and payments to the vendor of the selected one of the plurality of access-controlled programs and data and to the user, in accordance with the received clearing data, the at least one of crediting and debiting being performed without prepayment or subscription by the user, and/or making available information to the vendor, wherein the information is generated by the central unit, based on the user data, according to specified conditions on further use;

generating, via the central unit, a data token for decryption of a selected one of the plurality of access-controlled programs and data in accordance with the received access request data; and transmitting the data token to the receiving device, wherein the data token includes,
- at least portions of a key to the at least one of the plurality of access-controlled programs and data, or
- an access authorization for a key for decryption of the selected one of the plurality of access-controlled programs and data.

2. The method according to the claim 1, wherein access request data include at least certain of the conditions on further use of the user data, which at least certain conditions on further use are specified by the user in the access request data via the input elements of the receiving device.

3. The method according to the claim 1, wherein the access conditions data include cost parameters, which include the cost amounts for the access to the selected one of the plurality of access-controlled programs and data per unit of calculation.

4. The method according to the claim 1, wherein the billing data includes billing parameters for debiting or crediting monetary amounts to at least one of the user and vendor according to the selected one of the plurality of access-controlled programs and data.

5. The method according to the claim 1, wherein, during the access to the selected one of the plurality of access-controlled programs and data, at least parts of the clearing data are transmitted periodically by the receiving device to the central unit.

6. The method according to the claim 5, wherein a monetary value is stored in a data memory of the receiving device, costs for the access to the selected one of the plurality of access-controlled programs and data are determined in the receiving device based on the cost data of the received access conditions data, and clearing data are transmitted to the central unit upon the added up costs for access exceeding the stored monetary value, or at least one of a whole multiple of the stored monetary value, and a predetermined time window has expired.

7. The method according to the claim 5, wherein the clearing data transmitted from the receiving device to the central unit include data records which the user determines before the transmission.

8. The method according to the claim 1, wherein the vendor of the selected one of the plurality of access-controlled programs and data changes the broadcasting of the selected one of the access-controlled programs and data based on user data.

9. The method according to the claim 1, wherein the access request data includes data specifiable by the user via input elements of the receiving device, with which the user indicates to the vendor at least one of individual wishes and orders for the broadcasting of the selected one of the plurality of access-controlled programs and data.

10. The method according to the claim 1, wherein billing records are generated in the receiving device and are stored in a data memory of the receiving device, wherein the records include information corresponding to the cost amounts for access to the selected one of the plurality of access-controlled programs and data, and an identification of the vendor of the selected one of the plurality of access-controlled programs and data.

11. The method according to the claim 10, wherein at least one of the information and billing records are stored in a data memory which is integrated into a chip card that is removable from the receiving device.

12. The method according to the claim 1, wherein the programs include at least one of digital audio and video programs.

13. The method according to the claim 1, wherein the mobile receiving device is a mobile radio device.

14. The method according to the claim 1, wherein a monetary value is stored in a data memory of the receiving device, costs for the access to the selected one of the plurality of access-controlled programs and data are determined in the receiving device based on the cost data of the received access conditions data, the decryption of the selected one of the plurality of access-controlled programs and data is prevented in the receiving device upon the determined costs being greater than the stored monetary value, and the costs for the access to the selected one of the plurality of access-controlled programs and data are deducted from the stored monetary value.

15. The method according to the claim 14, wherein the data memory for storing the monetary value is a removable, reloadable chip card.

16. A communications system, comprising:
at least one broadcast transmitter, which encrypts and broadcasts at least one of a plurality of programs and data unidirectionally;
at least one mobile receiving device, including a broadcast receiver for receiving a selected one of the plurality of access-controlled programs and data, the receiving device including,
an access control module, which allows access to the selected one of the plurality of access-controlled programs and data upon received access conditions data coinciding with authorization data of the user, and
a decryption module for decrypting the selected one of the plurality of access-controlled programs and data;
a central unit, including a clearing module for processing of clearing data and communications modules for bidirectional communication of the mobile receiving device with the central unit over a mobile radio network, wherein the at least one mobile receiving device further includes input elements, by means of which input elements access request data, for the access to the selected one of the plurality of access-controlled programs and data, are at least partially specifiable by the user on the basis of received access conditions data, the access request data being transmitted from the receiving device to the central unit over the mobile radio network;
an access administration module, which transmits at least parts of the authorization data over the mobile radio network to the mobile receiving device in accordance with the transmitted access request data, wherein the clearing module includes means for, in accordance with the at least one of the received clearing data, credit and debit services or payments to the vendor as well as to the user, the services or payments being credited and debited without prepayment or subscription by the user, and/or make available to the vendor information with respect to the user data, the information being generated by the central unit according to specified conditions, the access administration module of the central unit including means for generating data tokens, wherein the data tokens are transmittable from the central unit to the receiving device, the data token including, at least portions of a key to the selected one of the plurality of access-controlled programs and data, or an access authorization to a key for decryption of the selected one of the plurality of access-controlled programs and data.

17. The communications system according to the claim 16, wherein the access request data include at least part of the conditions on further use of the user data, said at least part of the conditions on further use being specifiable by the user via the input elements of the receiving device.

18. The communications system according to the claim 16, wherein the access request data include cost parameters, which include the cost amounts for the access to the selected one of the plurality of access-controlled programs and data per unit of calculation.

19. The communications system according to the claim 16, wherein the billing data include billing parameters for debiting or crediting monetary values to at least one of the user and the vendor according to the selected one of the plurality of access-controlled programs and data.

20. The communications system according to the claim 16, wherein at least parts of the clearing data are transmittable to the central unit by the receiving device at least one of before, after, and periodically during the access to the selected one of the plurality of access-controlled programs and data.

21. The communications system according to the claim 20, wherein the receiving device includes a data memory, in which data memory a monetary value is storable, the receiving device includes a costs recording module by means of which costs recording module costs for the access to the selected one of the plurality of access-controlled programs and data are able to be determined based on the cost data of the received access conditions data, and clearing data are transmittable to the central unit by means of the communications module, upon the added up costs for access exceed the stored monetary value, or at least one of a whole multiple of the stored monetary value, and a predetermined time window has expired.

22. The communications system according to the claim 20, wherein the clearing data transmitted from the receiving device to the central unit include data records which are able to be determined by the user before the transmission.

23. The communications system according to the claim 16, wherein the broadcast transmitter of the vendor of the selected one of the plurality of access-controlled programs and data includes a transmission plan module, by means of which the broadcasting of the selected one of the plurality of access-controlled programs and data are changed in accordance with user data.

24. The communications system according to the claim 16, wherein the receiving device includes a data memory for storing billing records, which include information corresponding to at least one of the cost amounts for the access to the selected one of the plurality of access-controlled programs and data, and an identification of the vendor of the selected one of the plurality of access-controlled programs and data.

25. The communications system according to the claim 16, wherein the at least one of the information and billing records are storable in a data memory which is integrated in a chip card that is removable from the receiving device.

26. The communications system according to the claim 16, wherein the plurality of access-controlled programs include at least one of digital audio and video programs.

27. The communications system according to the claim 16, wherein the mobile receiving device is a mobile radio device.

28. The communications system according to the claim 16, wherein the receiving device includes a data memory in which a monetary value is stored, the receiving device includes a costs recording module which determines costs for the access to the selected one of the plurality of access-controlled programs and data based on the received access conditions data, the receiving module includes means for preventing access in the receiving device of the selected one of the plurality of access-controlled programs and data if the determined costs are greater than the stored monetary value, and the costs recording module is set up in such a way that it deducts the costs for the access to the selected one of the plurality of access-controlled programs and data from the stored monetary value.

29. The communications system according to the claim 28, wherein the data memory for storing the monetary value is a removable, reloadable chip card.

* * * * *